United States Patent [19]

Peterson

[11] Patent Number: 4,902,430
[45] Date of Patent: Feb. 20, 1990

[54] METHOD FOR CLEANING CERTAIN ESTUARIES, HARBORS, AND LAKES

[75] Inventor: Melvin N. A. Peterson, Del Mar, Calif.

[73] Assignee: The United States of America as represented by the Secretary of Commerce, Washington, D.C.

[21] Appl. No.: 303,414

[22] Filed: Jan. 30, 1989

[51] Int. Cl.$^4$ .............................................. E02B 8/02
[52] U.S. Cl. ...................................... 210/747; 175/57; 210/800; 405/52; 405/74
[58] Field of Search ................... 405/52, 53, 55, 74, 405/127, 128, 268; 210/154, 170, 242.1, 534, 538, 747, 800, 803; 166/105.1; 175/58, 57; 209/458, 493

[56] References Cited

U.S. PATENT DOCUMENTS

| | | | |
|---|---|---|---|
| 552,877 | 1/1896 | Ipson | 405/74 |
| 1,388,040 | 8/1921 | Hood | 405/74 |
| 1,995,238 | 3/1935 | Bisher | 405/74 |
| 2,126,576 | 8/1938 | Ranney | 405/74 |
| 2,436,630 | 2/1948 | Clegg | 405/74 |
| 2,798,639 | 7/1957 | Urban | 405/55 |
| 3,799,349 | 3/1974 | Stewart | 405/52 |
| 3,998,061 | 12/1976 | Rederon et al. | 405/55 |
| 4,386,473 | 6/1983 | Amann et al. | 175/58 |
| 4,614,458 | 9/1986 | Austin | 405/74 |
| 4,815,894 | 3/1989 | Copson | 405/128 |

Primary Examiner—Frank Spear
Assistant Examiner—Joseph Drodge
Attorney, Agent, or Firm—Thomas Zack; Alvin J. Englert; William H. Wright

[57] ABSTRACT

An arrangement for removing toxic sedimentary material (101) from a large body of water (102) by forming a large number of core holes (100) in at least the sediment layer (101); inserting sediment trap receptacles (200) in the core holes (100); allowing the sediment trap receptacle (200) to fill up with toxic sediment (101); and then withdrawing, emptying and reinserting the trap receptacles (200) within the core holes (100) to effect the removal of the toxic sediment (101) from the body of water (102).

3 Claims, 1 Drawing Sheet

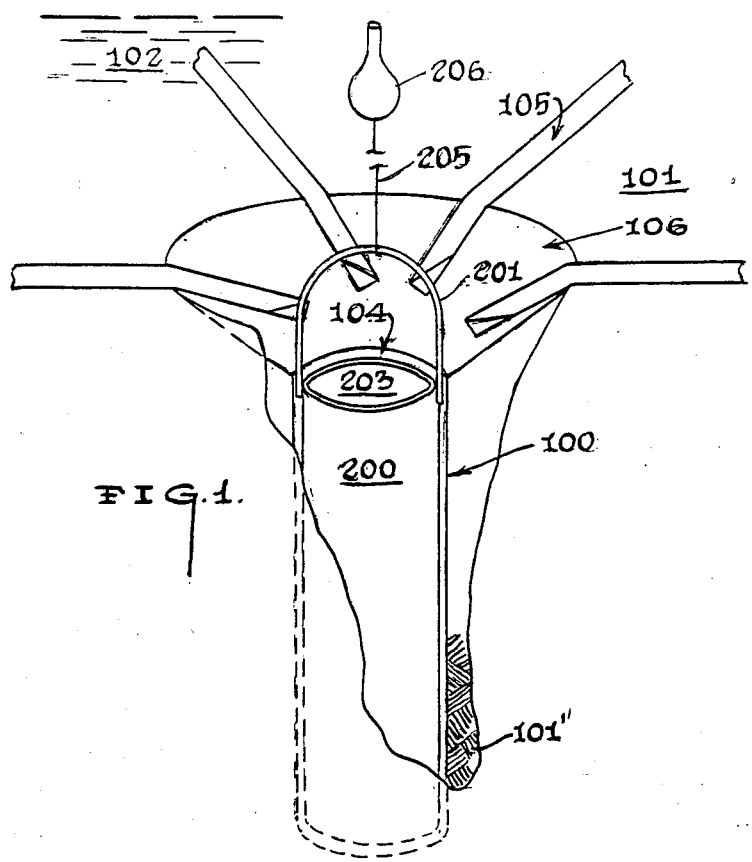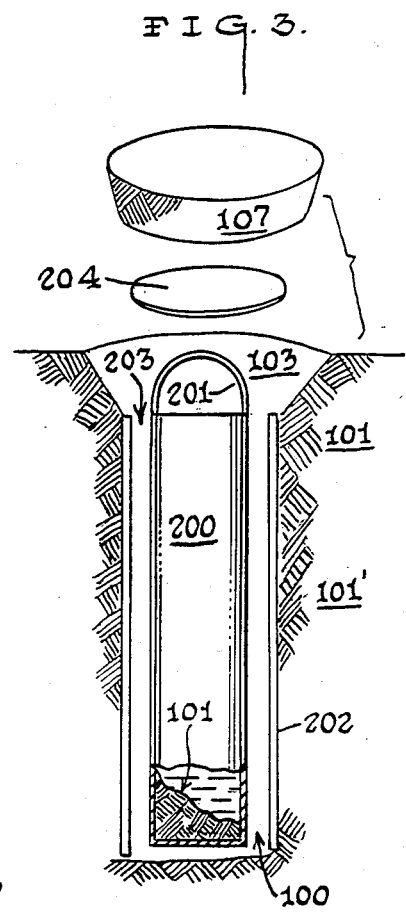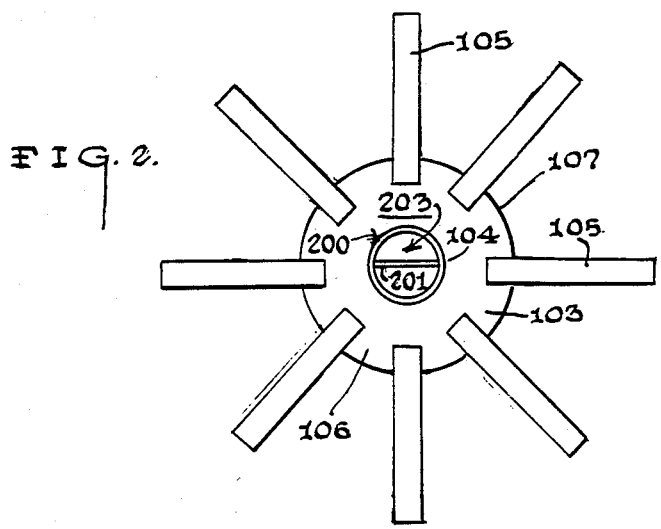

METHOD FOR CLEANING CERTAIN ESTUARIES, HARBORS, AND LAKES

TECHNICAL FIELD

The present invention relates generally to the field of waste management and environmental protection, and more specifically to a method for cleaning slow moving bodies of water such as harbors, estuaries and lakes.

BACKGROUND OF THE INVENTION

Certain estuaries, harbors and lakes have been the recipients of contaminants that have resulted from industrial and other societal activities, These contaminants, commonly metals, pesticides, and persistent industrial chemicals, have concentrated in the surface layer of sediments at the bottom of these bodies of water. Even if all continued influx were to stop, these chemicals constitute a bank or reserve that may remain available to diffuse back into the active ecosystems, and exert toxicity in accord with their composition and concentration. They also remain to comprise a more acute threat in the event of sudden disturbance, perhaps during severe storms or dredging operations or even clean-up operations that may substantially disturb and resuspend the sediment.

There are, indeed, significant bodies of water, with significant economic, aesthetic and ecological value, such as Chesapeake Bay, in which the surficial bottom sediments are toxified to the degree that many would consider any attempt to disturb the sediments as unwise, even for the purpose of attempting to remove them. Similarly, the same concerns surround dredging for its various other reasons, such as deepening shipping channels.

The toxified sediments are commonly not thick, being perhaps of the order of 10-100 cm. These thicknesses have been created by the various processes of sedimentation that have historically been active in the water bodies during the period of polluting. Neither thickness nor concentration of toxic components are necessarily uniform throughout the sediments of any body of water, nonetheless, the total volume of such sediments can be very large where the area is large.

Many of these sediments will be fine grained mud, with high organic content and large and reactive surface area on the very small and weathered mineral fragments, and with various coatings and grains of sulfides and oxides. Each of these traits is associated with ease of entrainment and entrapment of various toxic components.

As can be seen by reference to the following U.S. Pat. Nos. 1,388,040; 552,877; 1,995,238; 3,799,349; and, 4,614,458 the prior art has acknowledged and attempted to solve a somewhat similar problem of sedimentary accumulation; however, these prior art solutions are uniformly devoted to gross sediment accumulation in relatively fast flowing bodies of water, such as streams, rivers, canals and the like wherein the current flows generally in a single direction.

It should further be noted that while the prior art solutions are more than adequate for the specific environment in which they are employed, these previously patented remedies are not particularly suitable to the large expanse generally omni-directional current flows encountered in most harbors, bays, estuaries and large lakes.

It should also be noted that virtually all of the aforementioned prior art solutions envision the physical removal of the accumulated sediments from the bottom portion of the trap receptacle via pumping or mechanical dredging apparatus; and while those removal systems may be adequate for a relatively confined body of water the physical cost of installing such a system in larger bodies of water would not only be prohibitive; but would also result in large volume agitation and redistribution of the settled sedimentary deposits; and as a result would be counter productive to the goals of the present invention.

As a consequence of the foregoing situation there has existed a longstanding need among those individuals and agencies concerned with the removal of toxic sediment from large bodies of water for a relatively simple and straightforward method for accumulating, removing and/or isolating toxic sediments from relatively large bodies of water; and, the provision of such a solution is the stated objective of the present invention.

SUMMARY OF THE INVENTION

The basic scope of this invention is directed mainly toward the collection and relative isolation and containment of surficial fine grained sediments, that will importantly contain the toxic components, or toward the same relative isolation and containment with the purpose or view of future removal or isolation. This relative isolation and containment is to be viewed with respect to present circumstances and from the active ecosystems of relatively large and slow moving bodies of water. The concept may also offer some ability to cope with continuing additions of toxicity that may occur in the future, in the manner that has occurred historically to produce the present conditions.

The general concept of this invention is to create a series of spaced holes or defined depressions in the bottom sediments, with the purpose of creating sediment traps into which the normal and ongoing sedimentary processes would convey the surface sediments to their collection, containment and isolation, or later removal.

To accomplish this purpose, while satisfying the requirement of no significant resuspension of the toxified surface sediments, it is proposed to gravitationally penetrate the bottom sediments, assisted as necessary by reaming to force the hole open with torsion of the penetration tool.

Having created the holes, the sediment transport and continuing distribution and redistribution by currents, tidal action, gravity, bioturbation and all of the natural actions that brought the sediment into the vicinity of the holes, or exposed it to the uptake or mixing in of toxic components, will continue to operate. When a grain is carried into a hole, it will settle to the bottom, no longer being under the influence of these sediment transporting processes. The historically recent and recently contaminated sediment will be surficial and preferentially mobile, and be removed from the sediment surface to accumulate in the hole.

The number, diameter, depth and spacing of the holes would be determined by the volume of sediment that needs to be stripped from the surface and trapped. Also, the depth to which holes can be penetrated will depend both on the thickness of unconsolidated sediment and on sediment character. Topographically low areas would logically favor accumulation and would be preferred sites for these sediment traps.

The main objective of this invention is to reduce the area of contaminated sediment and its attendant exchange into the water and the active ecosystem. This strategy favors the additional strategy of fewer and deeper holes, but being consistent with effective entrapment in meaningful societal timescales.

Another objective of this invention is to induce the sediment in the surficial layer to enter the hole. The act of squeezing into the sediment, that is soft and plastic, may develop a small hill around the hole, which will operate against the objective. To overcome this circumstance, which is antagonistic to the basic purpose, any of several techniques may be used. As examples, the final act could consist of indenting the surface, with the same probe that creates the hole, with a radially shaped embossing configuration that would leave grooves, or channels, leading toward the hole; or the final act could be to scribe similar grooves, or channels, by means of arms that would be released and dragged to plow furrows across the small hill, leading toward the hole. Either technique could be part of the fundamental gravitational/torsional probe that makes the basic hole, or could be independently operated, either along the same suspension mechanism, a rod or pipe, or as a separate step that would emboss or scribe the downward-inward radial pattern oriented around the hole. The need for this active precaution will depend on many factors, including the sediment character near the surface, the vigor of near bottom currents and biological mixing and redistribution. Creating the holes by removing cores of mud or other sediment would provide an advantage in this specific regard, and should be part of any locality-specific evaluation and planning; such coring would, however, be difficult, probably more costly, and create its own additional issue of acceptable disposition of the core material.

Holes may tend to close spontaneously in many circumstances, and thus not remain open long enough to perform their desired function of accepting the surface toxified sediment. Depending on circumstances, and acceptability in particular situations, the holes or upper part of the holes could be propped open with a variety of retainers or sleeves that would last long enough that the holes will fill as desired.

The desired end result in any body of water or region within the body of water, will be a series of holes filled with the accumulated surface sediment, while the area between the holes has been striped down by the gentle erosion of natural bottom processes to expose the sediment below, at more acceptable levels of pre-pollution toxicity. Holes could be capped with acceptable clean sediment to provide a diffusion barrier.

A second case, an extension of the basic concept, must now be discussed. It should be obvious that the foregoing treatment could only be done once, or with great care, only a small number of times. Return performances would only exhume the toxics formerly isolated. Moreover, other desired actions, such as dredging to deepen shipping channels, would similarly expose formerly isolated surface sediments.

To provide for intentionally exhuming the material, such as in areas that may require future dredging, the concept would include lining the hole, or casing it, with persistent materials, such as steel. A small shallow funnel could be fastened to the casing to facilitate finding and re-entering the hole. This array, either just casing pipe or also with the re-entry cone would be inserted in the hole such that its upper extent is at the level to which erosion is desired.

In the event dredging, for example, would require the removal of the primary casings, they could then be pulled. A variation on this same theme, and also related to the coring concept, would be to insert into the mud the primary tubular casing, open at the bottom and possibly configured with teeth to assist in penetration while being rotated. Once in place the pipe could be cleaned of the substrate sediment core, all of which would be recovered, thus, with minimal dispersal of sediment into the body of water the desired configuration would be achieved, but without the mound of sediment surrounding the hole.

One additional level of sophistication is visualized. This involves leaving in a cased hole an additional sleeve, closed at the bottom, loose fitting for easy extraction, and equipped with fittings at the top to permit lifting it out of the cased hole when filled, or partially filled, with accumulated sediment. It would rest in the casing, with a gasket seal at the top to prevent sediment from entering the annular space between itself and the casing. This configuration would avail itself of all of the preceding advantages and would additionally provide for periodic emptying. This procedure will also be applicable in the many circumstances when continued inflow of contaminants simply cannot be stopped because of reservoirs of contaminants already in existence in drainage areas, because of accidents releasing contaminants into drainages and in places where areas of sediment transport or natural collection may afford opportunities to catch contaminated sediment in a local area and thereby protect a larger area.

BRIEF DESCRIPTION OF THE DRAWING

These and other objects, advantages and novel features of the invention will become apparent from the detailed description of the best mode for carrying out the preferred embodiment of the invention which follows; particularly when considered in conjunction with the accompanying drawings, wherein:

FIG. 1 is an isolated perspective view of one version of the sediment traps that will be deployed at spaced locations in the sedimentary layer of a body of water in accordance with the method of this invention;

FIG. 2 is a top plan view of the sediment trap depicted in FIG. 1;

FIG. 3 is a cross-sectional view of another version of the sediment traps that will be deployed at spaced locations in the sedimentary layer of a body of water in accordance with the method of this invention.

BEST MODE FOR CARRYING OUT THE INVENTION

As can be seen by reference to the drawings and in particular to FIG. 1, the basic components from both a structural and topographical or geological respect that are employed with the teachings of this invention comprise: a generally cylindrical elongated core hole (100) that is drilled or otherwise formed in the sediment layer (101) and submerged strata (101') at the bottom of a relatively large body of water (102) such as a bay, harbor, estuary or large lake; and, an elongated generally cylindrical sediment trap receptacle (200) equipped with a handle member (201) to facilitate the retrieval of the sediment trap receptacle (200) if and when desired.

In the first version depicted in FIGS. 1 and 2, there are a plurality of cylindrical core holes (100) formed at spaced locations in the bottom of a selected body of water (102) wherein each of the core holes (100) are provided with an enlarged generally conical depression (103) which extends outwardly from the mouth (104) of the core hole (100). In addition, a plurality of radially aligned grooves (105) are formed in the sedimentary layer (101) surrounding the conical depression (103); wherein, the radially aligned grooves (105) are disposed in an intersecting relationship relative to the conical depression (103); whereby the radial grooves extend a substantial distance into the mouth (106) of the conical depression (103).

In this particular version the conical depression (103) surrounding the sediment trap receptacle (200) acts as a funnel to promote the current induced migration of the sedimentary overlayer containing the most recently introduced toxic wastes into the mouth (203) of the sediment trap receptacle (200); whereupon, the sedimentary wastes will collect at the bottom of the sediment trap receptacle (200).

In addition, the radial grooves (105) will perform a dual function in directing suspended sedimentary particles into the conical depression (103), as well as, delaying the accumulation of the sedimentary particles around the peripheral lip (107) which surrounds the mouth (106) of the conical depression (103).

Furthermore, in the first version the inside diameter of the elongated core hole (100) is only slightly larger than the outside diameter of the outside diameter of the generally cylindrical sediment trap receptacle (200); wherein, the receptacle (200) will be slidingly received in the core hole (100).

Obviously in the instance thus far described the submerged strata (101') surrounding the core hole (100) must be relatively firm, to retain the desired configuration of the core hole (100), particularly when the sediment trap receptacle (200) is temporarily withdrawn and removed from the core hole (100) to effect the disposal of the accumulated sediment within the sediment trap receptacle (200).

Conversely, when the submerged strata (101') comprises a relatively loosely compacted and/or unstable medium it will be necessary to employ the alternate version of the preferred embodiment depicted in FIG. 3.

In this particular version a generally cylindrical core hole (100) is formed in the sediment layer (101) and submerged strata (101'); wherein, a generally cylindrical open ended liner element (202) is disposed within the core hole (100) to reinforce and stabilize the internal diameter of the core hole (100).

It should also be noted at this juncture that the method of this invention also contemplates employing the cylindrical liner element (202) in the boring process that is used to create the core hole (100); such as by equipping the lower periphery of the liner element (202) with teeth (not shown), to assist in the penetration of the sediment (101) and strata (101') layers in a well recognized manner.

In essence once the liner element (202) has been installed in the core hole (100) a generally cylindrical sediment trap receptacle (200) identical in all structural aspects to the sediment trap receptacle (200) depicted in FIGS. 1 and 3, is inserted within the liner element (202) to begin the process of accumulating the current borne top layer of toxic sediments.

In addition, it should be further noted that while the sediment trap receptacle (200) has an outside diameter which is less than the inside diameter of the liner element (202); the spacing depicted in the drawings is exaggerated for illustration purposes only; and, the sediment trap receptacle (200) is intended to be slidingly received within the liner element (202).

Furthermore, it should be emphasized that in both versions of this invention a conical depression (103) and a plurality of radial grooves (105) may be employed to promote the migration of the sedimentary wastes towards the mouth (203) of the sediment trap receptacle (200). However, in the second version depicted in FIG. 3, the conical depression (103) projects outwardly from the mouth (203) of the sleeve element (202).

It should also be appreciated that while the sediment trap receptacle (200) is intended to be repeatedly withdrawn from the core hole (100) to recover the accumulated toxic sediment (101) for subsequent handling; and, then reinsert the receptacle (200) for further accumulation of sediment (101); a time will come when the sediment trap receptacle (200) will either be permanently removed from the core hole (100) allowing the core hole (100) to continue the final accumulation process; or, the sediment trap receptacle (200) will be sealed to contain the entrapped toxic sediment (100).

As shown in FIG. 3, with respect to the latter scenario this invention further contemplates the use of capping means in the form of a trap receptacle cover (204) and/or a plug (107) of environmentally safe material to seal the contents of the sediment trap receptacle (200).

Briefly stated, the basic method of removing toxic sedimentary material from a large body of slow moving water such as harbors, bays, estuaries and lakes involves the process of creating a series of holes (100) at spaced locations through the submerged sediment (101) and strata layers (101') of a body of water (102). Then a like number of sediment trap receptacles (200) may be inserted within the series of core holes (100) whereupon the fluid currents in the body of water (102) will carry suspended particles of the top layer of toxic sediment into the sediment trap receptacles for collection.

Once the accumulated sedimentary material has filled the capacity of the sediment trap receptacles (200) the receptacles can be withdrawn, emptied, and reinserted into the holes (100) and the process will be repeated.

With respect to the removal and insertion steps of the sediment trap receptacle (200) with respect to the hole (100) it should be noted that in the different versions depicted in FIGS. 1 thru 3, the sediment trap receptacle (200) is provided with a handle member (201) which may be operatively engaged by suitable means to effect the withdrawal and the guided insertion of the receptacle (200) relative to the hole (100)

One such suitable means to effect the withdrawal of the receptacle (200) from the core hole (100) is depicted in FIG. 1; and, comprises an elongated tether element (205) attached to a buoyant member (206) wherein a surface vessel can locate the position of the individual receptacles (200) and employ the tether element (205) to effect the withdrawal thereof.

Having thereby described the subject matter of this invention it should be obvious that many substitutions, modifications and variations of the invention are possible in light of the above teachings. It is therefore to be understood that the invention as taught and described herein is only to be limited to extent of the breadth and scope of the appended claims.

I claim:

1. A method for the isolation, containment and removal of toxic sedimentary material from the top layer of sedimentary material deposited over a submerged strata layer of a selected large body of water having relatively slow moving and variable currents including harbors, bays, estuaries and lakes; wherein, the method consists of the following steps:
   (a) forming a plurality of generally elongated generally cylindrical bore holes at spaced locations in at least the sedimentary layer which overlies said submerge strata;
   (b) inserting a like plurality of generally cylindrical sediment trap receptacles dimensioned to be received within said bore holes to effect the gradual accumulation of the current borne suspended particles of toxic sedimentary material from the said top layer of sedimentary material; and,
   (c) disposing sleeve elements intermediate said bore holes and said sediment trap receptacles;
   (d) providing means for the withdrawal of said sediment trap receptacles from said bore holes;
   (e) and providing each of said bore holes with a conical depression which extends outwardly from the mouth of each bore hole and providing said concial depressions with a plurality of radially disposed grooves, formed in the sedimentary layer surrounding said concical depressions; wherein said radial grooves extend into the mouths of said conical depressions.

2. A method for the isolation, containment and removal of toxic sedimentary material from the top layer of sedimentary material deposited over a submerged strata layer of a selected large body of water having relatively slow moving and variable currents including harbors, bays, estuaries and lakes including the steps of:
   (a) boring a plurality of elongated generally cylindrical core holes in at least the sedimentary layer of material at spaced locations at the bottom of the selected large body of water;
   (b) inserting a plurality of open ended generally cylindrical sleeve elements into said core holes;
   (c) inserting a like plurality of generally cylindrical sediment trap receptacles into said cylindrical sleeve elements;
   (d) allowing the current in said selected body of water to carry suspended toxic sedimentary particles into said sediment trap receptacles;
   (e) allowing the toxic sedimentary material to accumulate within said sediment trap receptacles; and,
   (f) withdrawing said plurality of sediment trap receptacles from said plurality of core holes;
   (g) and providing each of said bore holes with a conical depression which extends outwardly from the mouth of each bore hole and providing said concial depressions with a plurality of radially disposed grooves, formed in the sedimentary layer surrounding said conical depressions; wherein said radial grooves extend into the mouths of said conical depressions.

3. The method of claim 2, further comprising the steps of:
   (h) emptying the contents of said plurality of sediment trap receptacles; and,
   (i) reinserting said plurality of sediment trap receptacles into said plurality of cylindrical sleeve elements.

* * * * *